(12) United States Patent
Kim

(10) Patent No.: US 12,247,926 B2
(45) Date of Patent: Mar. 11, 2025

(54) SYSTEM FOR DETECTING DEFECT OF ELECTRODE TAB AND METHOD FOR DETECTING DEFECT OF ELECTRODE TAB USING THE SAME

(71) Applicant: LG Energy Solution, Ltd., Seoul (KR)

(72) Inventor: Jung Han Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 326 days.

(21) Appl. No.: 17/917,147

(22) PCT Filed: Dec. 22, 2021

(86) PCT No.: PCT/KR2021/019632
§ 371 (c)(1),
(2) Date: Oct. 5, 2022

(87) PCT Pub. No.: WO2022/177123
PCT Pub. Date: Aug. 25, 2022

(65) Prior Publication Data
US 2023/0184690 A1     Jun. 15, 2023

(30) Foreign Application Priority Data
Feb. 17, 2021    (KR) .................. 10-2021-0020860

(51) Int. Cl.
*G01N 21/88* (2006.01)
*G06T 7/00* (2017.01)
*G01N 21/84* (2006.01)

(52) U.S. Cl.
CPC ............ *G01N 21/88* (2013.01); *G06T 7/001* (2013.01); *G01N 2021/8411* (2013.01); *G01N 2021/8887* (2013.01); *G06T 2207/30164* (2013.01)

(58) Field of Classification Search
CPC .......... G01N 21/88; G01N 2021/8411; G01N 2021/8887; G01N 21/8851; G01N 21/8806; G06T 7/001; G06T 2207/30164; Y02E 60/10; H01M 10/04; H01M 10/0404;
(Continued)

(56) References Cited

U.S. PATENT DOCUMENTS

| 2021/0050626 A1 | 2/2021 | Kim et al. |
| 2021/0344085 A1 | 11/2021 | Bae et al. |

FOREIGN PATENT DOCUMENTS

| CN | 111566862 A | 8/2020 |
| JP | 2000251882 A | 9/2000 |
| KR | 101133047 B1 | 4/2012 |

(Continued)

OTHER PUBLICATIONS

International Search Report for PCT/KR2021/019632 mailed Mar. 16, 2022. 3 pgs.
(Continued)

*Primary Examiner* — Samir A Ahmed
(74) *Attorney, Agent, or Firm* — Lerner David LLP

(57) ABSTRACT

A system for detecting a defect of an electrode tab, is capable of easily detecting whether an electrode tab is folded during a manufacturing process of a secondary battery, and a method of detecting a defect of an electrode tab using the same is disclosed. The system includes a gripper configured to grasp a unit cell including an electrode and to transfer the unit cell to a magazine and a visual inspection system to detect the electrode tab.

12 Claims, 8 Drawing Sheets

(58) Field of Classification Search
CPC ............ H01M 10/42; H01M 10/4285; H01M 50/531; Y02P 70/50
See application file for complete search history.

(56) References Cited

FOREIGN PATENT DOCUMENTS

| | | | |
|---|---|---|---|
| KR | 20130123099 A | 11/2013 |
| KR | 101438421 B1 | 9/2014 |
| KR | 20150061825 A | 6/2015 |
| KR | 101774261 B1 | 9/2017 |
| KR | 20180083060 A | 7/2018 |
| KR | 101981010 B1 | 8/2019 |
| KR | 20200053784 A | 5/2020 |
| KR | 102133915 B1 | 7/2020 |
| KR | 20200089173 A | 7/2020 |
| KR | 102146945 B1 | 8/2020 |
| KR | 20200114408 A | 10/2020 |
| KR | 20200131541 A | 11/2020 |
| KR | 20210009031 A | 1/2021 |
| KR | 20210014396 A | 2/2021 |
| WO | 2020130184 A1 | 6/2020 |
| WO | WO 2020231054 A1 * | 11/2020 |

OTHER PUBLICATIONS

Extended European Search Report for Application No. 21926921.4 dated Jul. 5, 2024, pp. 1-5.
Search Report dated Jan. 21, 2025 from the Office Action for Chinese Application No. 202180027382.5 Issued Jan. 23, 2025, pp. 1-3.

* cited by examiner

[FIG. 4]
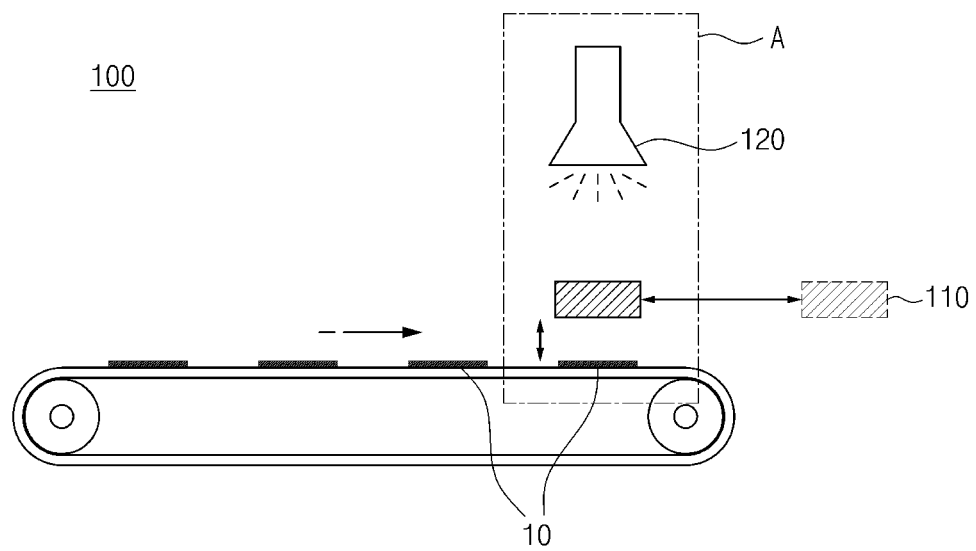

[FIG. 5]
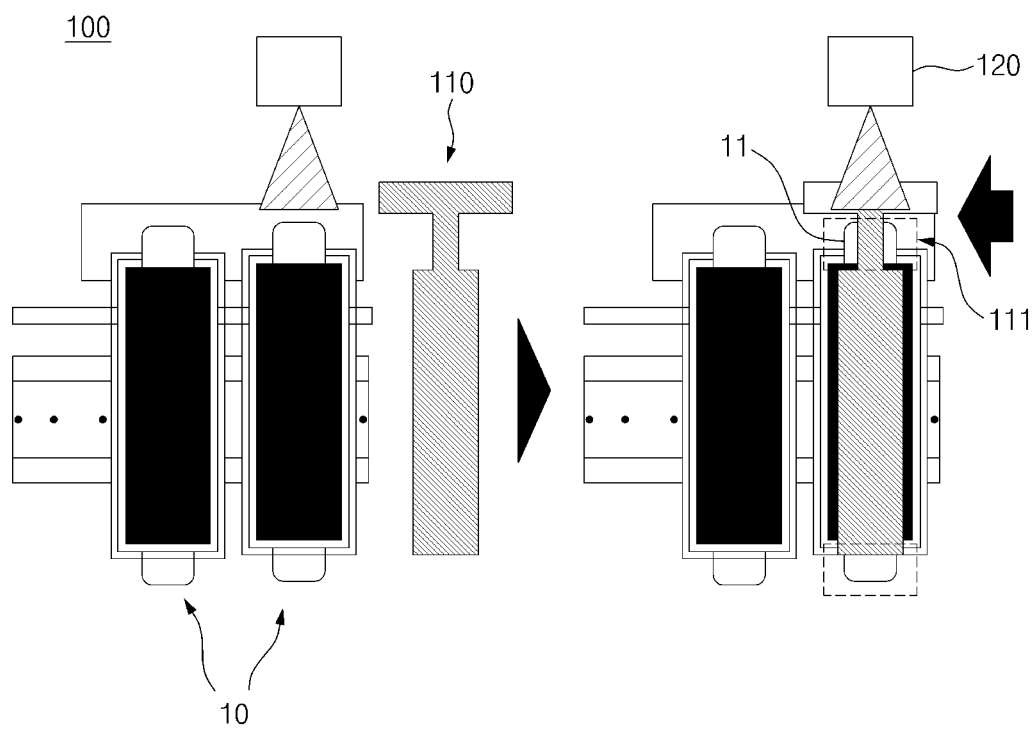

[FIG. 6]
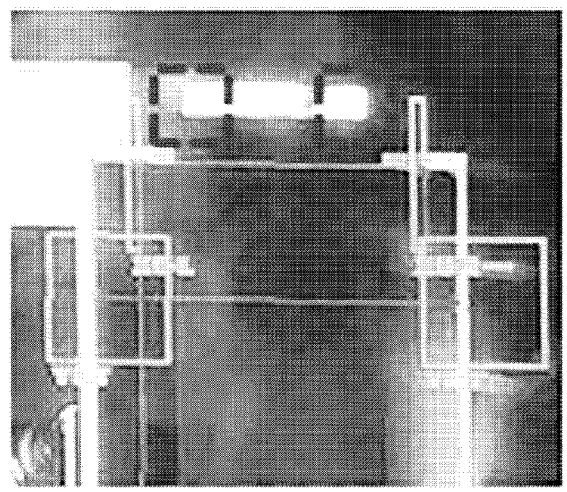
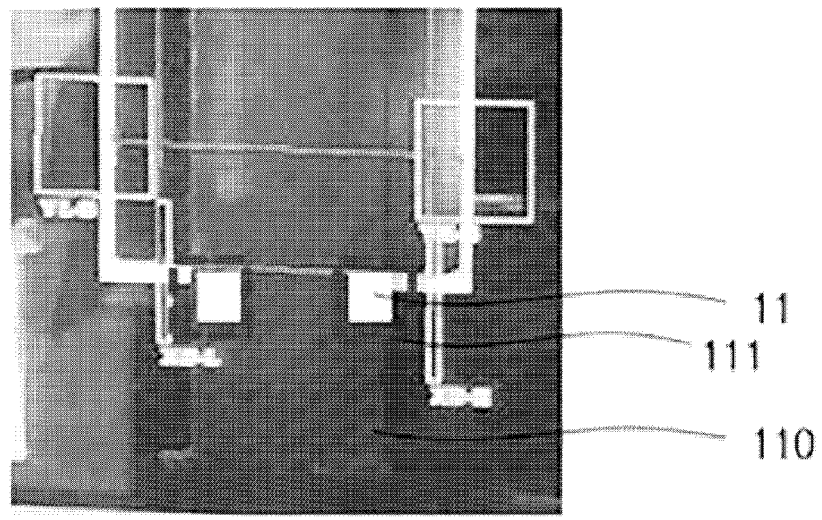

[FIG. 7]
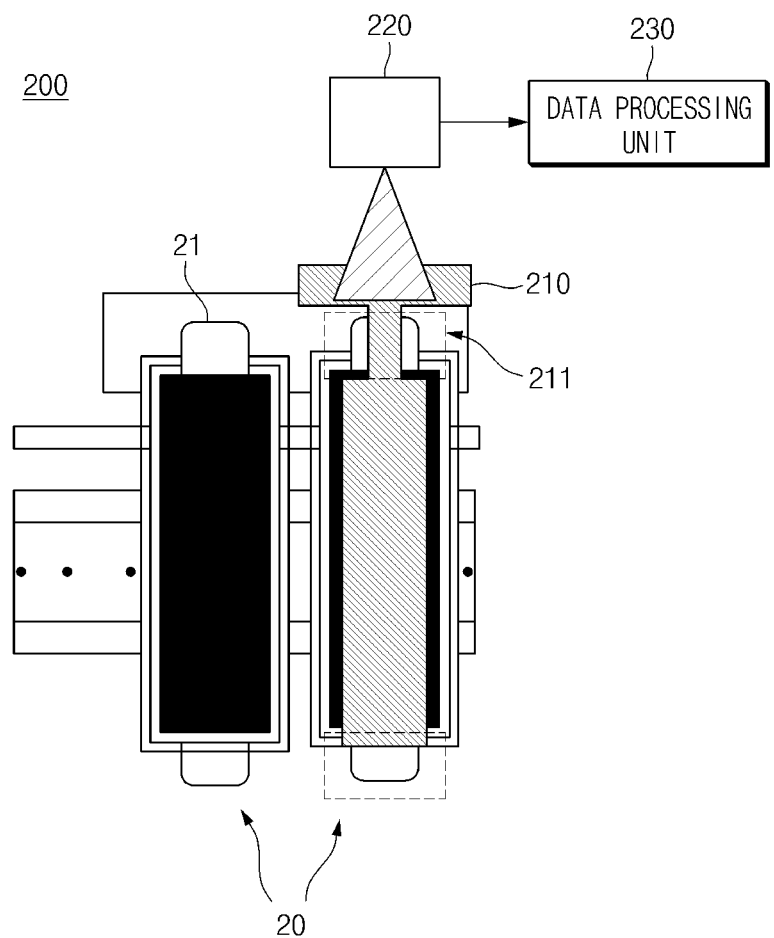

[FIG. 8]
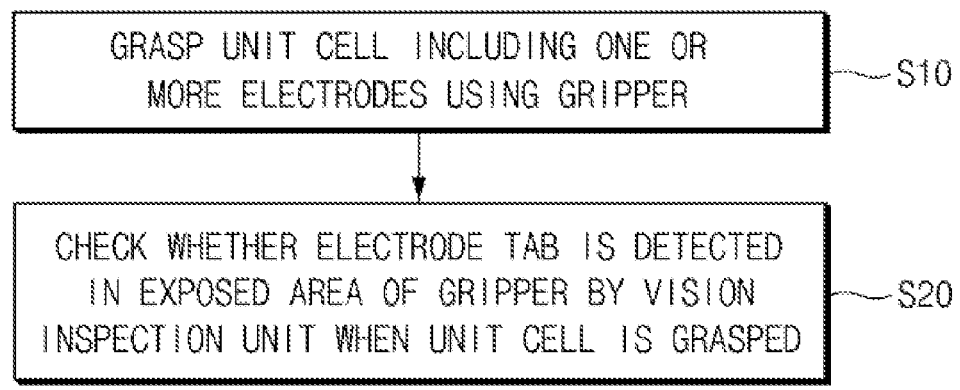

SYSTEM FOR DETECTING DEFECT OF ELECTRODE TAB AND METHOD FOR DETECTING DEFECT OF ELECTRODE TAB USING THE SAME

CROSS-REFERENCE TO THE RELATED APPLICATIONS

The present application is a national phase entry under 35 U.S.C. § 371 of the International Application No. PCT/KR2021/019632 filed on Dec. 22, 2021, which claims priority from Korean Patent Application No. 10-2021-0020860, filed on Feb. 17, 2021, the disclosures of which are incorporated herein by reference in their entireties.

FIELD OF THE INVENTION

The present invention relates to a system for detecting a defect of an electrode tab and a method of detecting a defect of an electrode tab using the same.

BACKGROUND OF THE INVENTION

Secondary batteries capable of charging and discharging have been widely used as energy sources or auxiliary power devices of wireless mobile devices. In addition, secondary batteries have attracted attention as energy sources of electric vehicles (EVs), hybrid EVs (HEVs), plug-in HEVs, etc., which are being proposed as a solution for air pollution caused by existing gasoline and diesel vehicles using fossil fuels.

Representatively, in terms of the shape of the battery, there is a high demand for prismatic secondary batteries and pouch-type secondary batteries that have a thin thickness and can be applied to products such as mobile phones, and in terms of the material of the battery, there is a high demand for lithium secondary batteries such as lithium ion batteries and lithium ion polymer batteries which have advantages such as high energy density, discharge voltage, output stability, and the like.

Secondary batteries are classified according to a structure type of an electrode assembly having a positive electrode/separator/negative electrode structure. Representatively, the secondary batteries may include a jelly-roll (winding) type electrode assembly having a structure in which long sheet-shaped positive electrodes and negative electrodes are wound with a separator interposed therebetween, a stack type (stacked) electrode assembly having a structure in which a plurality of positive electrodes and negative electrodes cut in units of a predetermined size are sequentially stacked with a separator interposed therebetween, a stack/folding type electrode assembly having a structure in which bi-cells or full cells, in which positive and negative electrodes are stacked in a predetermined unit with a separator interposed therebetween, are wound, and the like.

Accordingly, a secondary battery should be thoroughly inspected after each manufacturing process operation is performed and/or the finished product is manufactured. The inspection is one of the most important processes in the production process of secondary batteries and is important in terms of quality control to check whether desired performance and stability are provided. Here, the quality control is for the purpose of producing good products by determining whether the secondary battery has proper charging/discharging performance and filtering out defective products. When such quality control is performed well, high-quality secondary batteries can be produced.

FIG. 1 is an exploded perspective view schematically illustrating a general structure of a mono cell, FIG. 2 is a perspective view schematically illustrating a stacked structure of FIG. 1, and FIG. 3 is a view exemplarily illustrating a phenomenon in which an electrode tab of a mono cell is folded.

Referring to FIGS. 1 and 2, a mono cell 1 has a structure in which a positive electrode 2 having a positive electrode active material applied on both surfaces of a positive electrode current collector and a negative electrode 3 having a negative electrode active material applied on both surfaces of a negative electrode current collector are sequentially stacked with a separator 4 interposed therebetween. Further, a positive electrode tab 2-1 and a negative electrode tab 3-1, which are not coated with an active material, for being each electrically connected to one of a positive electrode lead and a negative electrode lead that constitute electrode terminals of a battery, are formed to protrude from end portions of the positive electrode current collector and the negative electrode current collector.

The positive electrode tab 2-1 and the negative electrode tab 3-1 are made of a foil material, and thus electrode tab folding may occur during a manufacturing process of a secondary battery. When such electrode tab folding occurs, the capacity of the secondary battery is reduced or an internal short is caused. Meanwhile, during the manufacturing process of the secondary battery, a gripper 5 is used for transferring the mono cell 1 to a loading section. As illustrated in FIG. 3, the gripper 5 grasps the mono cell 1 and transfers the mono cell 1 to the loading section. In this process, when the electrode tabs 2-1 and 3-1 of the mono cell 1 are lifted, electrode tab folding occurs due to interference caused by the gripper 5. In this case, the mono cell 1 grasped by the gripper 5 is covered by the gripper 5, and thus it is not possible to check whether the electrode tabs are folded.

In particular, in a structure in which the mono cells 1 are stacked, it is not possible to inspect electrode tab folding occurring therein from the outside.

BRIEF SUMMARY

Aspects of the present invention may solve the above problems and may provide a system for detecting a defect of an electrode tab, which is capable of easily detecting whether an electrode tab is folded during a manufacturing process of a secondary battery, and a method of detecting a defect of an electrode tab using the same.

The present disclosure is directed to providing a system for detecting a defect of an electrode tab. In one example, the system for detecting a defect of an electrode tab according to an embodiment of the present invention includes a gripper configured to grasp a unit cell including an electrode and transfer the unit cell to a magazine, wherein the gripper has an exposed area formed so that a portion of an area facing an electrode tab of the electrode is exposed, and a visual inspection unit configured to check whether the electrode tab is detected in the exposed area of the gripper when the unit cell is grasped.

In another example, the system for detecting a defect of an electrode tab according to an embodiment of the present invention may further include a data processing unit configured to determine whether the electrode tab is defective according to whether the electrode tab is detected, which is checked by the visual inspection unit. In a specific example, when it is checked that the electrode tab is not detected in the exposed area of the gripper, the data processing unit may determine that the electrode tab is defective due to being folded. Furthermore, when it is checked that the electrode tab is detected in the exposed area of the gripper, the data processing unit may determine that the electrode tab is normal.

In one example, in the system for detecting a defect of an electrode tab, the exposed area of the gripper may be formed in a shape of one or more notches at a portion overlapping the electrode tab of the unit cell grasped to the gripper.

Furthermore, the gripper may further include an adsorption unit for grasping the unit cell by vacuum.

In one example, the visual inspection unit may include a camera configured to capture an image of the unit cell grasped by the gripper, and a light source configured to irradiate the unit cell with light for imaging.

Meanwhile, the unit cell may be a mono cell or a half cell.

An aspect of the present invention is also directed to providing a method of detecting a defect of an electrode tab using the system for detecting a defect of an electrode tab described above. In one example, the method of detecting a defect of an electrode tab according to an aspect of the present invention includes grasping a unit cell including an electrode using a gripper having an exposed area formed so that a portion of an area facing the electrode tab of the electrode is exposed, and checking, by a visual inspection unit, whether the electrode tab is detected in the exposed area of the gripper when the unit cell is grasped.

In another example, the method of detecting a defect of an electrode tab according to an aspect of the present invention may further include determining whether the electrode tab is defective according to whether the electrode tab is detected in the exposed area of the gripper.

In a specific example, the determining of whether the electrode tab is defective may include determining that the electrode tab is defective due to being folded when it is checked that the electrode tab is not detected in the exposed area of the gripper.

Furthermore, the determining of whether the electrode tab is defective may include determining that the electrode tab is normal when it is checked that the electrode tab is detected in the exposed area of the gripper.

Advantageous Effects

According to a system for detecting a defect of an electrode tab and a method of detecting a defect of an electrode tab using the same of the present invention, it is possible to easily detect whether an electrode tab is folded during a manufacturing process of a secondary battery.

BRIEF DESCRIPTION OF THE DRAWINGS

FIG. 4 is a schematic view of a system for detecting a defect of an electrode tab according to an embodiment of the present invention.

FIG. 5 is a schematic view illustrating a process of detecting a defect of an electrode tab in area A of FIG. 4.

FIG. 6 is a view showing a photograph taken by a visual inspection unit when a unit cell is grasped by a gripper in the system for detecting a defect of an electrode tab according to the present invention.

FIG. 7 is a schematic view illustrating a system for detecting a defect of an electrode tab according to another embodiment of the present invention.

FIG. 8 is a flowchart illustrating a method of detecting a defect of an electrode tab according to an embodiment of the present invention.

DETAILED DESCRIPTION

Figure 1:
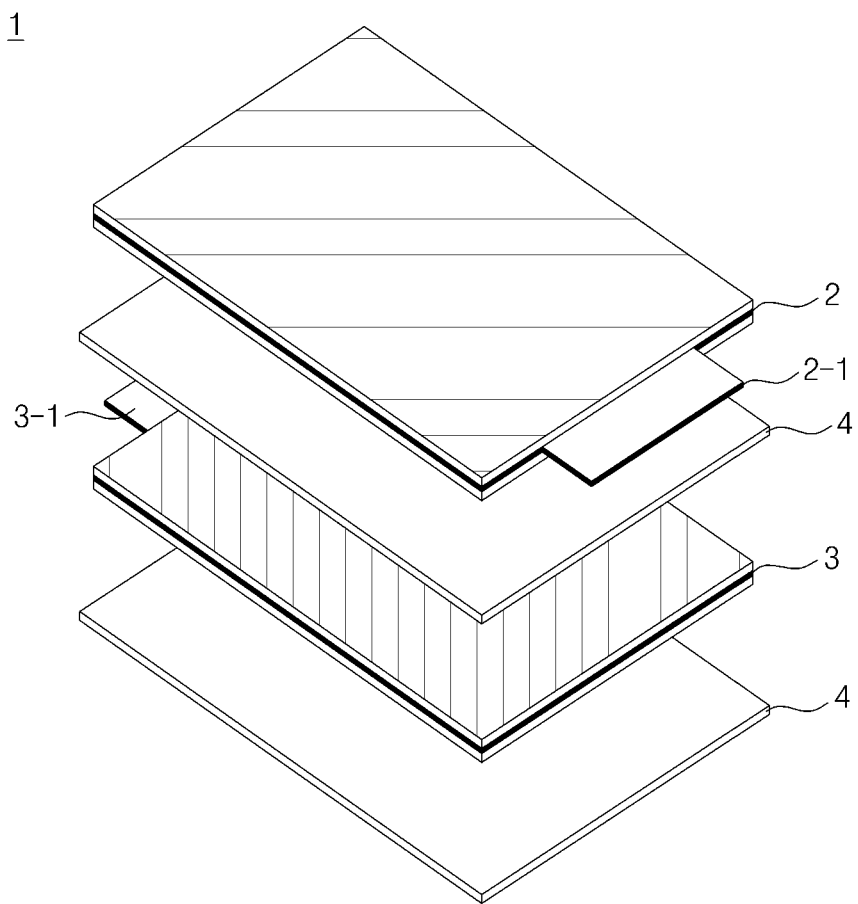
FIG. 1 is an exploded perspective view schematically illustrating a general structure of a mono cell.
Figure 2:
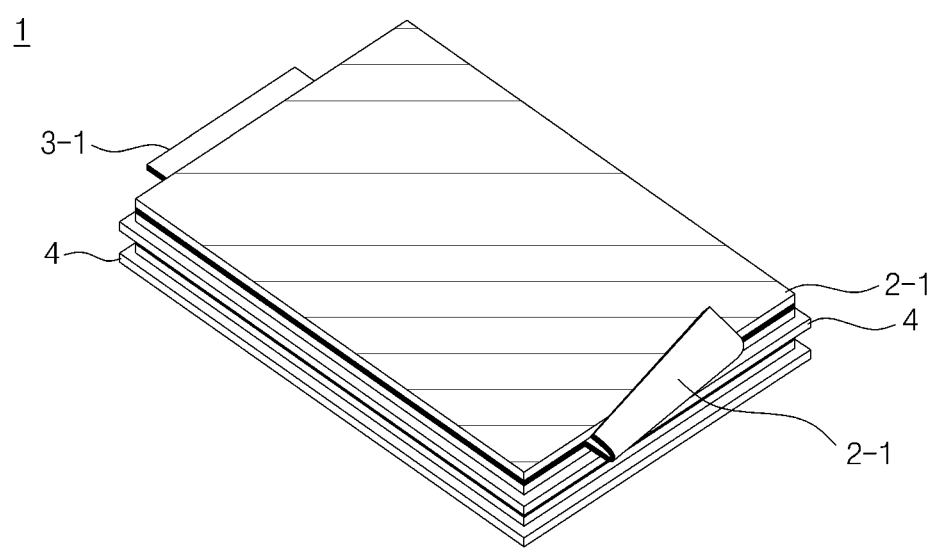
FIG. 2 is a perspective view schematically illustrating a stacked structure of FIG. 1.
Figure 3:
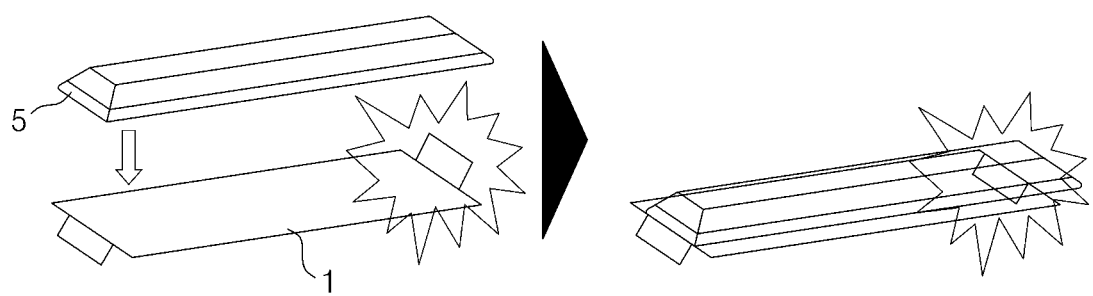
FIG. 3 is a view exemplarily illustrating a phenomenon in which an electrode tab of a mono cell is folded.

Hereinafter, the present invention will be described in detail with reference to the accompanying drawings. Terms and words used in this specification and claims should not be construed as being limited to commonly used meanings or meanings in dictionaries and should be construed with meanings and concepts which are consistent with the technological scope of the present invention based on the principle that the inventors have appropriately defined concepts of terms in order to describe the present invention in the best way.

The present invention relates to a system for detecting a defect of an electrode tab and a method of detecting a defect of an electrode tab using the same.

Generally, a gripper is used for transferring a mono cell to a loading section during a manufacturing process of a secondary battery. The gripper grasps the mono cell and transfers the mono cell to the loading section. In this process, when electrode tabs of the mono cell are lifted, electrode tab folding occurs due to interference caused by the gripper. In this case, the mono cell grasped by the gripper is covered by the gripper, and thus it is not possible to check whether the electrode tabs are folded. In particular, in the structure in which the mono cells are stacked, it is not possible to inspect electrode tab folding occurring therein from the outside.

Accordingly, in the present invention, a system for detecting a defect of an electrode tab, which is capable of easily detecting whether an electrode tab is folded during a manufacturing process of a secondary battery, and a method of detecting a defect of an electrode tab using the same are provided. Specifically, according to the system for detecting a defect of an electrode tab and the method of detecting a defect of an electrode tab using the same of the present invention, when a gripper grasps a unit cell including an electrode, whether an electrode tab is defective may be easily checked by checking whether the electrode tab is detected in an exposed area of the gripper.

In the present invention, the term "unit cell including the electrode" may refer to a mono cell in which a first electrode, a separator, and a second electrode are sequentially stacked or a mono cell in which a separator, a first electrode, a separator, and a second electrode are sequentially stacked, and may refer to a half cell in which a separator, a first electrode, and a separator are sequentially stacked or a half cell in which a separator, a second electrode, and a separator are sequentially stacked. Meanwhile, the first electrode may be a positive electrode or a negative electrode and the second electrode may be an electrode having a polarity different from that of the first electrode. For example, the unit cell may be a mono cell in which a separator, a first electrode (negative electrode), a separator, and a second electrode (positive electrode) are sequentially stacked, and the first electrode and the second electrode may have a structure in which electrode tabs are formed at opposite end portions to extend from the end portions.

Mode of the Invention

Hereinafter, a system for detecting a defect of an electrode tab and a method of detecting a defect of an electrode tab using the same according to the present invention will be described in detail with reference to the accompanying drawings.

First Embodiment

FIG. 4 is a schematic view of a system for detecting a defect of an electrode tab according to an embodiment of the present invention, and FIG. 5 is a schematic view illustrating a process of detecting a defect of an electrode tab in area A of FIG. 4.

Referring to FIGS. 4 and 5, a system 100 for detecting a defect of an electrode tab according to the present invention includes a gripper 110 which grasps a unit cell 10 including an electrode and transfers the unit cell 10 to a magazine (not illustrated), wherein the gripper 110 has an exposed area 111 formed so that a portion of an area facing an electrode tab 11 of the electrode is exposed, and a visual inspection unit 120 which checks whether the electrode tab 11 is detected in the exposed area 111 of the gripper 110 when the unit cell 10 is grasped. In a specific example, the system 100 for detecting a defect of an electrode tab according to the present invention may easily check whether the electrode tab 11 is defective by checking whether the electrode tab 11 is detected in the exposed area 111 of the gripper 110 when the unit cell 10 including the electrode is grasped.

First, the gripper 110 serves to transfer the unit cell 10 to the magazine and may be a gripper 110 for transferring a mono cell to a loading section in a typical secondary battery stacking process. The gripper 110 may have one of various structures and shapes. Furthermore, the gripper 110 may include an adsorption unit (not illustrated) for grasping the unit cell 10 by vacuum. For example, a plurality of adsorption units may be provided and may grasp a plurality of areas of an upper surface of the unit cell 10. Meanwhile, any adsorption unit that allows the unit cell 10 to be grasped to the gripper 110 by grasping the unit cell 10 by vacuum may be used as the adsorption unit without limitation. Meanwhile, the magazine may be a loading section for loading the unit cell 10 in order to manufacture an electrode assembly and may be a typical magazine for stacking cells.

In one example, the exposed area 111 is formed in the gripper 110. Specifically, the exposed area 111 is for checking whether the electrode tab 11 of the electrode of the unit cell 10 is defective, and is formed in a portion of an area of the gripper 110 facing the electrode tab 11. In the drawings, the exposed area 111 is illustrated as being only one side of the gripper 110 which is an area facing the first electrode tab 11, but the present invention is not limited thereto. The exposed areas 111 may be formed in all of areas of the gripper 110 facing the first electrode tab 11.

Any area formed to be exposed among the areas facing the electrode tab 11 can be used as the exposed area 111 of the gripper 110 without limitation. In one example, the exposed area 111 of the gripper 110 may be formed in a shape of one or more notches at a portion overlapping the electrode tab 11 of the unit cell 10 grasped to the gripper 110. The notches may be formed to be curved in a longitudinal direction of the gripper 110 and may be formed to be symmetrical with each other in the longitudinal direction of the gripper 110.

In the drawings, the exposed area 111 of the gripper 110 is illustrated as being curved to have a notch shape, but the exposed area 111 of the gripper 110 may have a shape of a typical hole instead of the notch shape. Any area formed to be exposed among the areas facing the electrode tab 11 can be used as the exposed area 111 of the gripper 110 without limitation.

Furthermore, in the system 100 for detecting a defect of an electrode tab according to the present invention, in a state in which the gripper 110 grasps the unit cell 10, the visual inspection unit 120 may perform a visual alignment inspection. In a specific example, when the visual inspection unit 120 performs a visual alignment inspection, whether the electrode tab 11 is defective may be checked according to whether the electrode tab 11 is detected in the exposed area 111 of the gripper 110.

In one example, the visual inspection unit 120 may serve to inspect external dimensions of the unit cell 10 and include a camera (not illustrated), which captures an image of the unit cell 10 grasped by the gripper 110, and a light source (not illustrated) that irradiates the unit cell 10 with light for imaging.

In a specific example, when the unit cell 10 is grasped by the gripper 110, charge-coupled device (CCD) cameras positioned above and below the unit cell 10 may photograph the unit cell 10 to measure external dimensions of the unit cell while a pair of light sources positioned above and below the unit cell 10 emit light. Furthermore, any light source that helps a camera to accurately measure the external dimensions of the unit cell 10 can be used as the light source without limitation, and the light source may be, for example, light-emitting diode (LED) lights. However, in the related art, for position correction, a position of the unit cell 10 when the unit cell 10 is loaded is corrected by measuring dimensions of 8-point positions, whereas, in the present invention, dimensions of the position facing the electrode tab 11 in addition to the existing 8-point positions may be additionally measured.

That is, the system 100 for detecting a defect of an electrode tab according to the present invention may easily check whether the electrode tab 11 is defective by checking whether the electrode tab 11 is detected in the exposed area of the gripper 110 when the unit cell 10 is grasped.

FIG. 6 is a view showing a photograph taken by the visual inspection unit when the unit cell 10 is grasped to the gripper 110 in the system for detecting a defect of an electrode tab according to the present invention. Referring to FIG. 6, it can be confirmed that, when the unit cell 10 is grasped to the gripper 110, the electrode tab 11 is detected in the exposed area 111 of the gripper 110.

Second Embodiment

FIG. 7 is a schematic view illustrating a system for detecting a defect of an electrode tab according to another embodiment of the present invention.

Referring to FIG. 7, a system 200 for detecting a defect of an electrode tab according to the present invention includes a gripper 210 which grasps a unit cell 20 including an electrode and transfers the unit cell 20 to a magazine, wherein the gripper 210 has an exposed area 211 formed so that a portion of an area facing an electrode tab 21 of the electrode is exposed, and a visual inspection unit 220 which checks whether the electrode tab 21 is detected in the exposed area 211 of the gripper 210 when the unit cell 20 is grasped. Meanwhile, the system 200 for detecting a defect of an electrode tab according to the present invention further includes a data processing unit 230 that determines whether an electrode tab is defective according to whether the electrode tab 21 is detected, which is checked by the visual inspection unit 220.

In a specific example, the data processing unit 230 may check whether the electrode tab 21 is detected in the exposed area 211 of the gripper 210 using data obtained by a camera of the visual inspection unit 220 to determine whether the electrode tab 21 is defective. In addition, the data processing unit 230 may compare the data with reference data that is previously stored to check whether the data has a deviation value that is greater than or equal to a threshold value.

In a specific example, when it is checked that the electrode tab 21 is not detected in the exposed area 211 of the gripper 210, the data processing unit 230 may determine that the electrode tab 21 is defective due to being folded. Furthermore, when it is checked that the electrode tab 21 is detected in the exposed area 211 of the gripper 210, the data processing unit 230 may determine that the electrode tab 21 is normal. Meanwhile, the corresponding unit cell 20 is classified as normal or defective according to a determination value determined by the data processing unit 230. In addition, the unit cells 20 classified as normal may be transferred to the magazine and may be manufactured as a secondary battery according to the secondary battery manufacturing process, and the unit cells classified as defective may be discarded.

In addition, a storage unit for additionally storing the determination value determined by the data processing unit 230 may be further included. In a specific example, the storage unit may receive and store an image which is captured by the visual inspection unit 220 and the determination value.

Third Embodiment

FIG. 8 is a flowchart illustrating a method of detecting a defect of an electrode tab according to an embodiment of the present invention. Referring to FIG. 8, the method of detecting a defect of an electrode tab according to the present invention includes an operation S10 of grasping a unit cell including an electrode using a gripper having an exposed area formed so that a portion of an area facing the electrode tab of the electrode is exposed, and an operation S20 of checking, by a visual inspection unit, whether the electrode tab is detected in the exposed area of the gripper when the unit cell is grasped.

The method of detecting a defect of an electrode tab according to the present invention may be performed in the process of grasping the unit cell including the electrode and transferring the unit cell to the magazine or the process of grasping the unit cell using the gripper. In particular, in the method of detecting a defect of an electrode tab according to the present invention, the gripper in which the exposed area described above is formed is used in the process of grasping the unit cell and transferring the unit cell to the magazine. The gripper is positioned to face the unit cell when grasping the unit cell, and has the exposed area formed so that a portion of an area facing the electrode tab of the electrode is exposed.

In a specific example, the visual inspection unit may perform an alignment visual inspection in a state in which the gripper grasps the unit cell. Furthermore, when the visual inspection unit performs a visual alignment inspection, whether the electrode tab is defective may be checked according to whether the electrode tab is detected in the exposed area of the gripper.

The method of detecting a defect of an electrode tab according to the present invention is performed using the system for detecting a defect of an electrode tab described above, and a description of the configuration of the system for detecting a defect of an electrode tab will be omitted.

In addition, the method of detecting a defect of an electrode tab according to the present invention further includes determining whether the electrode tab is defective according to whether the electrode tab is detected in the exposed area of the gripper.

In a specific example, the determining of whether the electrode tab is defective may include determining whether the electrode tab is defective by checking whether the electrode tab is detected in the exposed area of the gripper using data obtained by a camera of the visual inspection unit. In addition, a data processing unit may compare the data with reference data that is previously stored to check whether the data has a deviation value that is greater than or equal to a threshold value.

That is, the determining of whether the electrode tab is defective may include determining that the electrode tab is defective due to being folded when it is checked that the electrode tab is not detected in the exposed area of the gripper. Furthermore, the determining of whether the electrode tab is defective may include determining that the electrode tab is normal when it is checked that the electrode tab is detected in the exposed area of the gripper.

Meanwhile, in the determining of whether the electrode tab is defective, the corresponding unit cell is classified as normal or defective on the basis of information on an image of the unit cell which is captured by the visual inspection unit. Then, the unit cells determined as defective are discarded.

Furthermore, the unit cells determined as normal by the method of detecting a defect of an electrode tab of the present invention may be manufactured as a battery cell by performing an additional process after stacking the unit cells on the magazine as described above.

In particular, the battery cell manufactured after performing the method of detecting a defect of an electrode tab of the present invention may be a pouch-type battery cell. The battery cell is a pouch-type unit cell and may have a structure in which an electrode assembly having a positive electrode/separator/negative electrode structure is embedded in an external laminate sheet material in a state in which the electrode assembly is connected to electrode leads formed outside the external material. In a specific example, the battery cell may be a pouch-type battery cell having a structure in which the electrode leads protrude outward from the sheet and extend in opposite directions.

The present invention has been described in detail with reference to the drawings and embodiments. However, since the embodiments described in this specification and configurations illustrated in the drawings are only exemplary embodiments and do not represent the overall technological scope of the present invention, it should be understood that the present invention covers various equivalents and modifications at the time of filing of this application.

REFERENCE NUMERALS

1: MONO CELL
2: POSITIVE ELECTRODE
2-1: POSITIVE ELECTRODE TAB
3: NEGATIVE ELECTRODE
3-1: NEGATIVE ELECTRODE TAB
4: SEPARATOR
5: GRIPPER
10, 20: LAMINATE
11, 21: ELECTRODE TAB
100, 200: SYSTEM FOR DETECTING DEFECT OF ELECTRODE TAB
110, 210: GRIPPER
111, 211: EXPOSED AREA 120, 220: VISUAL INSPECTION UNIT
230: DATA PROCESSING UNIT

The invention claimed is:

1. A system for detecting a defect of an electrode tab, the system comprising:
    a gripper configured to grasp a unit cell including an electrode and to transfer the unit cell to a magazine, wherein the gripper has an exposed area formed so that a portion of an area facing an electrode tab of the electrode is exposed; and
    a visual inspection unit configured to check whether the electrode tab is detected in the exposed area of the gripper when the unit cell is grasped.

2. The system of claim 1, further comprising a data processing unit configured to determine whether the electrode tab is defective according to whether the electrode tab is detected, which is checked by the visual inspection unit.

3. The system of claim 2, wherein, when it is checked that the electrode tab is not detected in the exposed area of the gripper, the data processing unit is configured to determines that the electrode tab is defective due to being folded.

4. The system of claim 2, wherein, when it is checked that the electrode tab is detected in the exposed area of the gripper, the data processing unit is configured to determines that the electrode tab is normal.

5. The system of claim 1, wherein the exposed area of the gripper is formed in a shape of one or more notches at a portion overlapping the electrode tab of the unit cell grasped to the gripper.

6. The system of claim 1, wherein the gripper further includes an adsorption unit for grasping the unit cell by vacuum.

7. The system of claim 1, wherein the visual inspection unit comprises:
    a camera configured to capture an image of the unit cell grasped by the gripper; and
    a light source configured to irradiate the unit cell with light for imaging.

8. The system of claim 1, wherein the unit cell including the electrode is a mono cell or a half cell.

9. A method of detecting a defect of an electrode tab, the method comprising:
    grasping a unit cell including an electrode using a gripper having an exposed area formed so that a portion of an area facing the electrode tab of the electrode is exposed; and
    checking, by a visual inspection unit, whether the electrode tab is detected in the exposed area of the gripper when the unit cell is grasped.

10. The method of claim 9, further comprising determining whether the electrode tab is defective according to whether the electrode tab is detected in the exposed area of the gripper.

11. The method of claim 10, wherein the determining whether the electrode tab is defective includes determining that the electrode tab is defective due to being folded when it is checked that the electrode tab is not detected in the exposed area of the gripper.

12. The method of claim 10, wherein the determining whether the electrode tab is defective includes determining that the electrode tab is normal when it is checked that the electrode tab is detected in the exposed area of the gripper.

* * * * *